(12) United States Patent
Wakakuwa

(10) Patent No.: US 10,908,105 B2
(45) Date of Patent: Feb. 2, 2021

(54) METHOD FOR MEASURING AMOUNT OF RESIDUAL RESIN MATERIAL IN POROUS METAL BODY

(71) Applicant: HONDA MOTOR CO., LTD., Tokyo (JP)

(72) Inventor: Yu Wakakuwa, Tochigi-ken (JP)

(73) Assignee: HONDA MOTOR CO., LTD., Tokyo (JP)

( * ) Notice: Subject to any disclaimer, the term of this patent is extended or adjusted under 35 U.S.C. 154(b) by 213 days.

(21) Appl. No.: 16/142,005

(22) Filed: Sep. 26, 2018

(65) Prior Publication Data
US 2019/0101498 A1 Apr. 4, 2019

(30) Foreign Application Priority Data
Sep. 29, 2017 (JP) .................................. 2017-189790

(51) Int. Cl.
*G01N 25/00* (2006.01)
*G01N 25/22* (2006.01)
*H01M 4/86* (2006.01)
*H01M 4/88* (2006.01)
*H01M 4/92* (2006.01)

(52) U.S. Cl.
CPC ........... *G01N 25/22* (2013.01); *H01M 4/8621* (2013.01); *H01M 4/8875* (2013.01); *H01M 4/92* (2013.01)

(58) Field of Classification Search
CPC combination set(s) only.
See application file for complete search history.

(56) References Cited

U.S. PATENT DOCUMENTS

| 6,301,887 B1 * | 10/2001 | Gorel ................... F01N 3/0222 123/563 |
| 2008/0230171 A1 | 9/2008 | Mei et al. |
| 2011/0047987 A1 * | 3/2011 | Yoda ..................... F01N 11/002 60/287 |
| 2013/0276552 A1 * | 10/2013 | Sanchez ............... G01N 1/2247 73/863.03 |

FOREIGN PATENT DOCUMENTS

JP  2008-229514  10/2008

* cited by examiner

*Primary Examiner* — Lisa M Caputo
*Assistant Examiner* — Nasir U. Ahmed
(74) *Attorney, Agent, or Firm* — Amin, Turocy & Watson LLP

(57) ABSTRACT

A differential thermal analysis of a plurality of metal-resin-containing layers, the resin material amounts of which are known and different from each other, is carried out. Heights of sample peaks observed at one temperature in the differential thermal analysis are measured, and a correlation between the resin material amounts and the sample peak heights is obtained. Then, a differential thermal analysis of a porous metal body is carried out, and a height of a peak observed at the same temperature is measured. An amount of a residual resin material in the porous metal body is obtained based on the measured height and the correlation.

6 Claims, 4 Drawing Sheets

METHOD FOR MEASURING AMOUNT OF RESIDUAL RESIN MATERIAL IN POROUS METAL BODY

CROSS-REFERENCE TO RELATED APPLICATION

This application is based upon and claims the benefit of priority from Japanese Patent Application No. 2017-189790 filed on Sep. 29, 2017, the contents of which are incorporated herein by reference.

BACKGROUND OF THE INVENTION

Field of the Invention

The present invention relates to a method for measuring an amount of a residual resin material in a porous metal body. The porous metal body is prepared by forming a metal-resin-containing layer containing a metal material and a resin material having a melting point lower than that of the metal material and then removing the resin material from the metal-resin-containing layer.

Description of the Related Art

A fuel cell has an anode and a cathode containing a metal material as an electrode catalyst. An electrode reaction in the fuel cell proceeds at a higher rate when the electrode catalyst (the metal material) has a larger contact area with a fuel gas supplied to the anode or an oxygen-containing gas supplied to the cathode. Accordingly, a method of using a porous body of the metal catalyst as the electrode catalyst is proposed in Japanese Laid-Open Patent Publication No. 2008-229514.

In this method, metal layers containing the metal catalyst and mixture layers containing a carbon material and at least one of Sn, Al, Cu and Zn are stacked alternately. Then, the stack is subjected to a heat treatment and an acid treatment. In the acid treatment, the stack is immersed in an acidic solution such as hydrochloric acid, so that Sn, Al, Cu and Zn in the mixture layers are dissolved and removed to produce the porous body of the metal catalyst (the porous metal body).

SUMMARY OF THE INVENTION

The method described in Japanese Laid-Open Patent Publication No. 2008-229514 requires the acid treatment. The number of steps in the method may be reduced by omitting the acid treatment. The porous metal body may be produced without the acid treatment by forming a mixture layer containing a metal material and a resin material and by melting the resin material in the mixture layer. However, in this case, the amount of the residual resin material in the mixture layer cannot be evaluated.

A principal object of the present invention is to provide a method capable of easily measuring an amount of a residual resin material in a porous metal body.

According to an aspect of the present invention, there is provided a method for measuring an amount of a residual resin material in a porous metal body, the porous metal body being prepared by forming a metal-resin-containing layer containing a metal material and a resin material having a melting point lower than that of the metal material and then removing the resin material from the metal-resin-containing layer, the method comprising a first thermal analysis step of carrying out a differential thermal analysis of a plurality of the metal-resin-containing layers, the resin material amounts of which are known and different from each other, a correlation obtaining step of measuring heights of sample peaks observed at a temperature in the first thermal analysis step, to obtain a correlation between the resin material amounts and the sample peak heights, a second thermal analysis step of carrying out a differential thermal analysis of the porous metal body, the amount of the residual resin material of which is not known, and a residual amount measurement step of measuring a height of a peak observed in the second thermal analysis step at the same temperature as in the correlation obtaining step, to obtain the amount of the residual resin material in the porous metal body based on the measured height and the correlation.

In the present invention, the differential thermal analysis of the samples (the metal-resin-containing layers) having the known resin material amounts is carried out to obtain the correlation between the resin material amounts and the sample peak heights. For example, a calibration line is formed based on the correlation. Then, the differential thermal analysis of the porous metal body having the unknown resin material amount is carried out. Therefore, the amount of the residual resin material in the porous metal body can be easily evaluated based on the peak height at the same temperature as for the samples, and the calibration line. Thus, the amount of the residual resin material in the porous metal body can be easily analyzed quantitatively.

By using the method of the present invention, the amount of the residual resin material in the resultant porous metal body can be determined by selecting the amount of the resin material used in the process of forming the metal-resin-containing layer. Thus, the amount of the resin material used in the process of forming the metal-resin-containing layer can be selected in such a manner that the resultant porous metal body contains a smallest amount of the residual resin material.

When the resin material is heated in an oxidation atmosphere, the resin material undergoes a combustion reaction, and thus is bonded to oxygen. Therefore, it is preferred that the first thermal analysis step and the second thermal analysis step are carried out in the oxidation atmosphere. In this case, the peaks can be easily obtained. This is because the peaks are formed based on the combustion reaction of the resin material.

In the present invention, the differential thermal analysis of the samples having the known resin material amounts is carried out to obtain the correlation between the resin material amounts and the sample peak heights. Then, the differential thermal analysis of the porous metal body having the unknown resin material amount is carried out, and the residual resin material amount is evaluated based on the correlation and the peak height at the same temperature. Therefore, the amount of the residual resin material in the porous metal body can be easily evaluated. Thus, the amount of the residual resin material can be easily measured quantitatively.

The above and other objects, features, and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

A preferred embodiment of a method for measuring an amount of a residual resin material in a porous metal body according to the present invention will be described in detail below with reference to the accompanying drawings.

Figure 1:
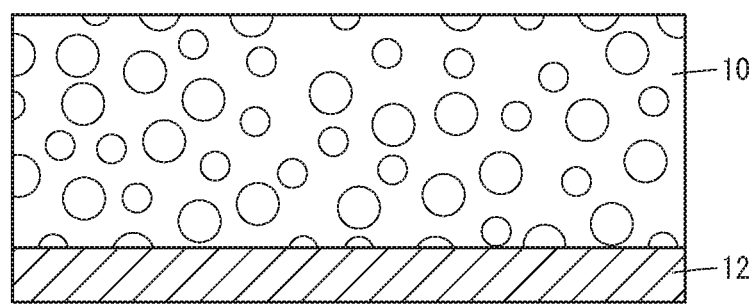
FIG. 1 is a schematic cross-sectional view of a porous metal body formed on a base.

A porous metal body 10 will be described below with reference to FIG. 1. The porous metal body 10 is a porous body of a metal material formed on a base 12. The metal material is preferably a material capable of acting as a metal catalyst for promoting an electrode reaction in an anode or a cathode in a fuel cell. Specific examples of such materials include platinum, palladium, gold, rubidium, and alloys thereof. Thus, the porous metal body 10 may be used as an electrode catalyst for the fuel cell.

A material for the base 12 is not particularly limited as long as the porous metal body 10 can be formed on the base 12 by a production method to be hereinafter described. In a case where the porous metal body 10 is produced as the electrode catalyst, the base 12 preferably contains a carbon paper, a carbon cloth, or the like. In this case, the base 12 may be used as a gas diffusion layer.

Figure 2:
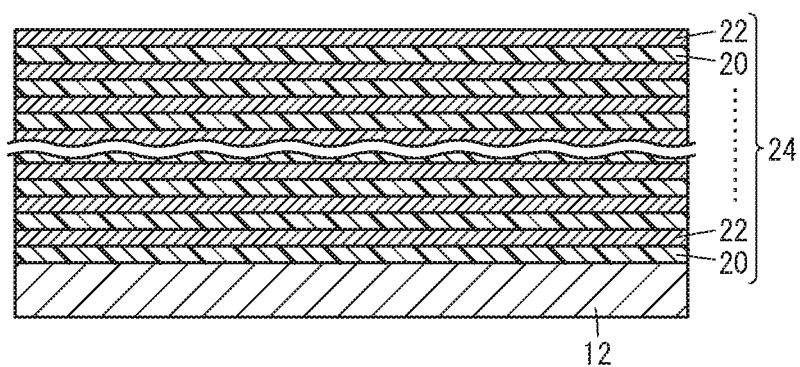
FIG. 2 is a schematic cross-sectional view of a metal-resin-containing layer formed by stacking metal layers and resin layers.

The porous metal body 10 may be produced by the following method. First, as shown in FIG. 2, a metal layer 20 containing the above described metal material is formed on the base 12 containing the carbon paper, the carbon cloth, or the like. The metal layer 20 may be formed by a known method such as sputtering or vapor deposition.

Then, a resin layer 22 containing a resin material is formed on the metal layer 20. The melting point of the resin material in the resin layer 22 is lower than that of the metal material in the metal layer 20. The resin layer 22 may be formed by a known method such as vapor deposition. Preferred examples of the resin materials include thermoplastic resins such as polypropylenes, polyethylenes, and polyimides. A metal-resin-containing layer 24 containing a stack of the metal layers 20 and the resin layers 22 is formed on the base 12 by repeating the layer formation.

Next, the metal-resin-containing layer 24 is subjected to a heat treatment. In this heat treatment, most of the resin material is melted and vaporized, and particles of the metal material are bonded to each other. While the resin material is vaporized, a three-dimensional network structure of pores is formed inside the metal material to produce the porous metal body 10. Thus, the resin material in the metal-resin-containing layer 24 acts as a pore-forming agent.

The method for measuring the amount of the residual resin material in the porous metal body 10 will be described below.

A first thermal analysis step is carried out as follows. Specifically, a differential thermal analysis of a plurality of the metal-resin-containing layers 24, the resin material amounts of which are known and different from each other, is conducted. The resin material amount may be controlled, e.g., by changing the thickness of the resin layer 22. The differential thermal analysis may be performed by using a TG-DTA apparatus.

The resin material undergoes a combustion reaction at an increased temperature in an oxidation atmosphere. Accordingly, a sample peak is easily formed in the differential thermal analysis. Therefore, it is preferred that the differential thermal analysis is carried out in the oxidation atmosphere. For example, the oxidation atmosphere is preferably an air atmosphere.

Figure 3:
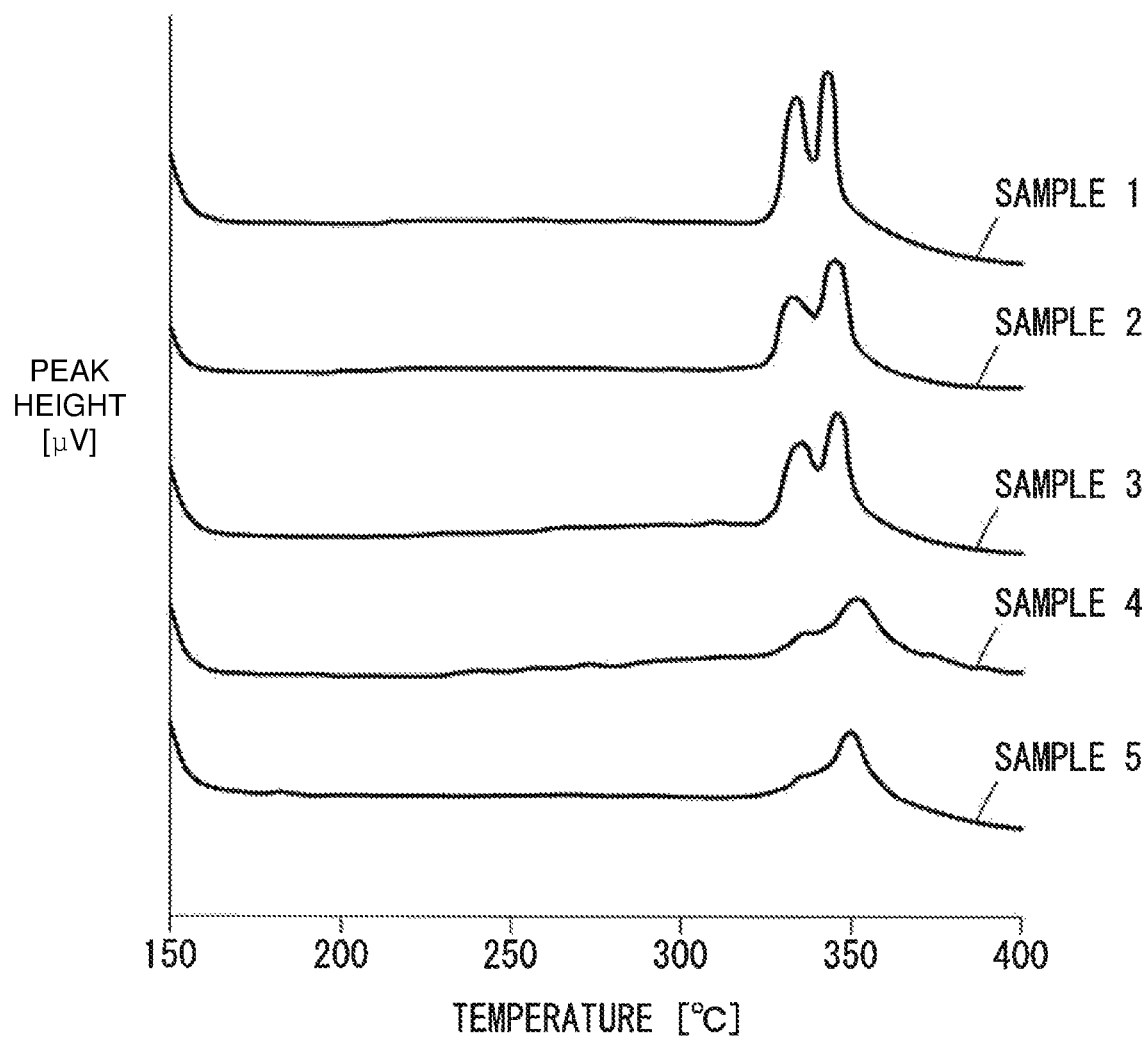
FIG. 3 is an analysis chart showing differential thermal analysis results of samples having known resin material amounts.

The differential thermal analysis results of Samples 1 to 5 are shown in FIG. 3. Sample 1 is the carbon paper (the base 12) having no resin layer 22. Samples 2, 3, 4, and 5 are the carbon papers having the resin layers 22, and have resin material amounts of 2.5%, 5%, 15%, and 25% by weight respectively. The resin material amounts are calculated from the thicknesses of the resin layers 22. The sample peaks of Samples 1 to 5 are observed at a temperature of 342° C.

Figure 4:
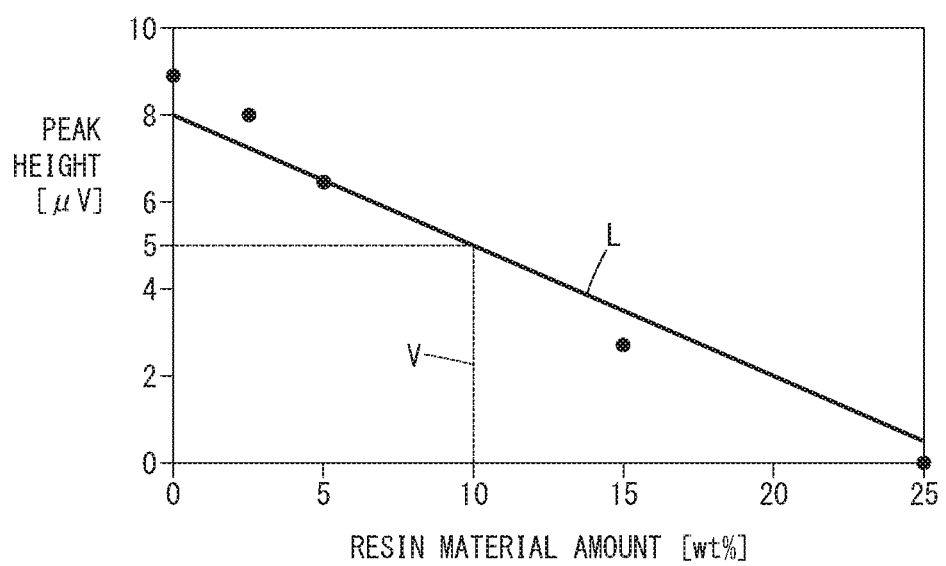
FIG. 4 is a chart showing a relationship between resin material amount and peak height obtained from the differential thermal analysis results shown in FIG. 3 as a calibration line.

Then, a calibration line formation step (a correlation obtaining step) is carried out as follows. As shown in FIG. 4, the differential thermal analysis results are plotted on a chart, in which the resin material amounts of Samples 1 to 5 are shown on the horizontal axis, and the sample peak heights of Samples 1 to 5 are shown on the vertical axis. The plotting is approximated by a straight line using a least-square method or the like. The straight line is used as a calibration line L as shown in FIG. 4.

A measurement sample is taken out from the porous metal body 10. A second thermal analysis step is carried out using the measurement sample. Also in the second thermal analysis step, a differential thermal analysis is preferably performed in an oxidation atmosphere such as an air atmosphere.

In the second thermal analysis step, also the measurement sample of the porous metal body 10 provides a peak at a temperature of 342° C. Then, in a residual amount measurement step, a resin material amount as the X coordinate corresponding to the height of this peak as the Y coordinate is read from the calibration line L (correlation line) shown in FIG. 4. The resin material amount on the X axis is obtained from the X coordinate of the intersection of the calibration line L and the vertical line V.

For example, when the Y coordinate value of the peak height is 5 μV, the X coordinate value corresponding to the Y coordinate value obtained by the calibration line L is 10% by weight. It is clear from the result that the amount of the residual resin material in the measurement sample (i.e. the porous metal body 10) is 10% by weight.

In this embodiment, the amount of the residual resin material in the porous metal body 10 can be easily measured in the above manner. In other words, in a case where the amount of the residual resin material is not known, a quantitative analysis can be carried out.

The present invention is not particularly limited to the above embodiment, and various changes and modifications may be made therein without departing from the scope of the invention.

For example, the metal material in the porous metal body 10 is not limited to the metal catalyst for the fuel cell, and may be titanium, cobalt, nickel, or the like. Similarly, the base 12 may be composed of a material other than the carbon paper and the carbon cloth.

It is not necessary to carry out the first thermal analysis step every time the amount of the residual resin material is measured. Furthermore, it is not necessary to quantitatively measure the amount of the residual resin material. The method of the present invention may be used for judging whether the amount of the residual resin material is smaller or not than a predetermined amount. Specifically, after the sample peak heights at the same temperature are recorded in the first thermal analysis step, when the peak height of the porous metal body 10 is equal to or more than a predetermined height in the second thermal analysis step, the porous metal body 10 can be judged to have a significantly small amount of the residual resin material.

What is claimed is:

1. A method for measuring an amount of a residual resin material in a porous metal body, the porous metal body being prepared by forming a metal-resin-containing layer containing a metal material and a resin material having a melting point lower than a melting point of the metal material and by removing the resin material from the metal-resin-containing layer, the method comprising:

a first thermal analysis step of carrying out a differential thermal analysis of a plurality of the metal-resin-containing layers, the resin material amounts of which are known and different from each other, a correlation obtaining step of measuring heights of sample peaks observed at a temperature in the first thermal analysis step, to obtain a correlation between the resin material amounts and the sample peak heights, a second thermal analysis step of carrying out a differential thermal analysis of the porous metal body, an amount of the residual resin material of which is not known, and a residual amount measurement step of measuring a height of a peak observed in the second thermal analysis step at the same temperature as in the correlation obtaining step, to obtain the amount of the residual resin material in the porous metal body based on the measured peak height and the correlation.

2. The method according to claim 1, wherein the first thermal analysis step and the second thermal analysis step are carried out in an oxidation atmosphere.

3. The method according to claim 1, wherein the metal-resin-containing layer is a stack of a metal layer and a resin layer.

4. The method according to claim 3, wherein the resin material is removed from the metal-resin-containing layer by a heat treatment.

5. The method according to claim 3, wherein the metal-resin-containing layer is formed on a base.

6. The method according to claim 5, wherein the metal material contains platinum, palladium, gold, rubidium, or an alloy thereof, and the base contains a carbon paper or a carbon cloth.

* * * * *